United States Patent Office 3,201,146
Patented Aug. 17, 1965

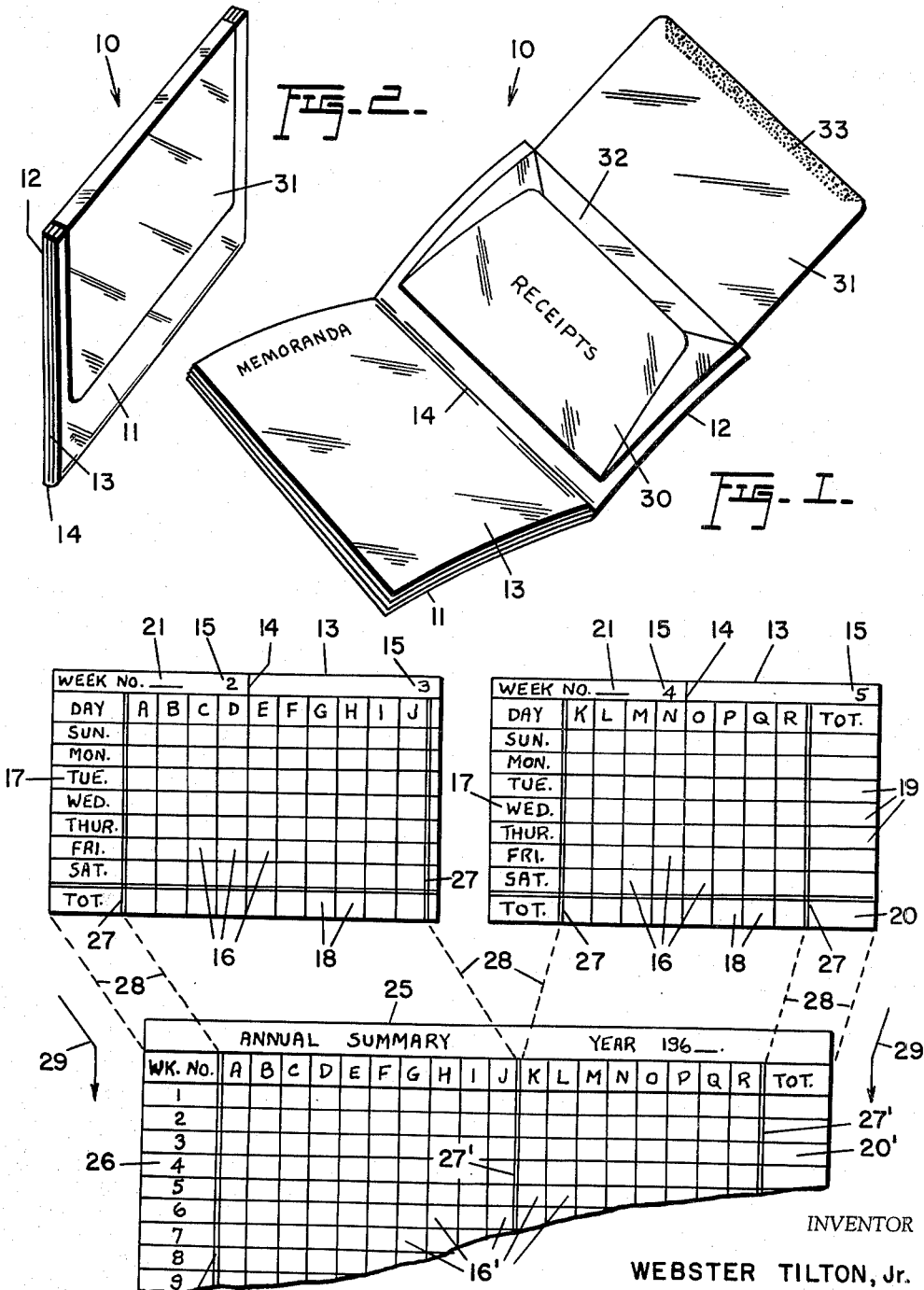

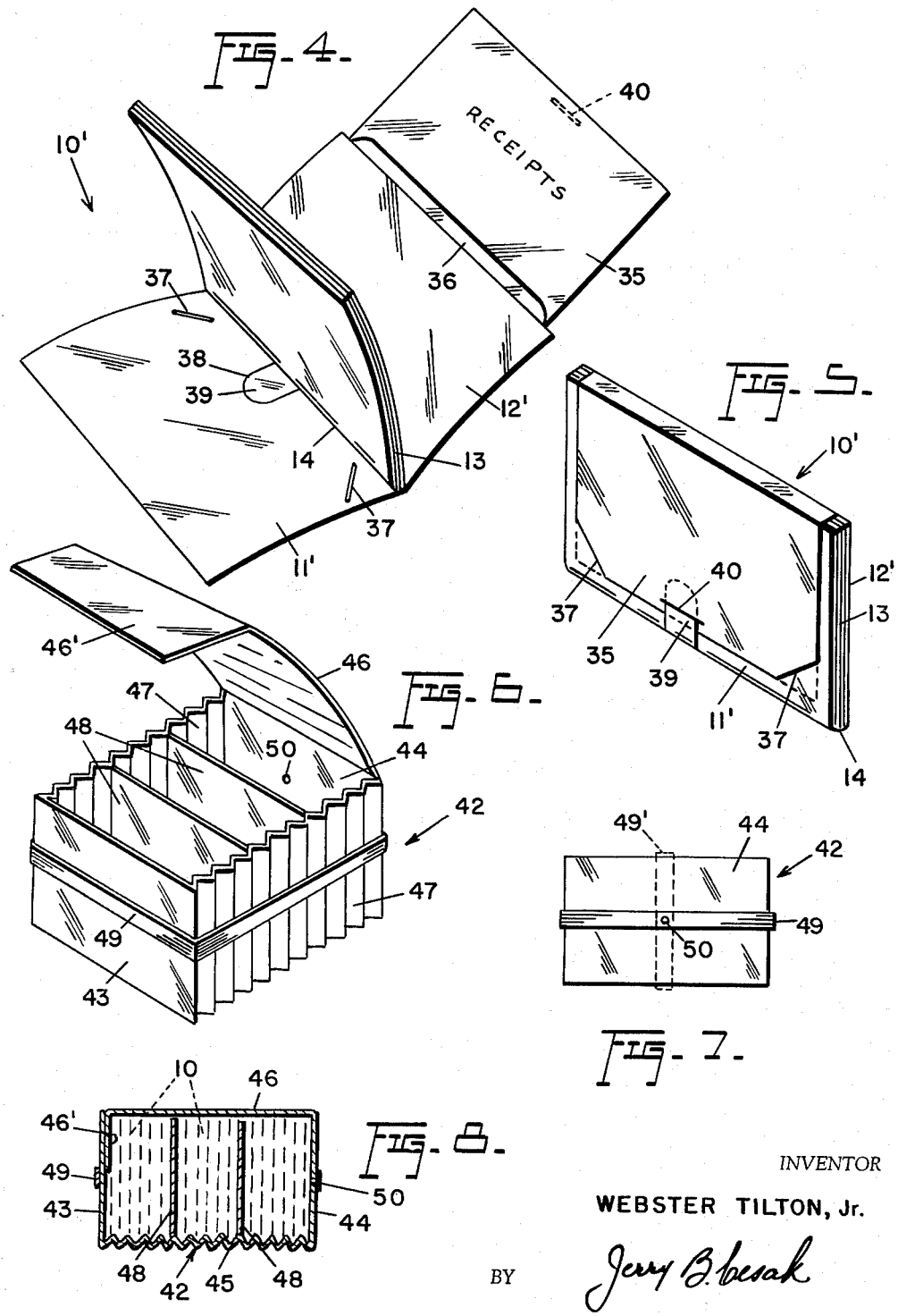

3,201,146
ACCOUNTING SYSTEMS
Webster Tilton, Jr., 2720 Wisconsin Ave. NW.,
Washington 7, D.C.
Filed Mar. 13, 1963, Ser. No. 264,877
2 Claims. (Cl. 281—31)

This invention relates to new and useful improvements in accounting systems, and in particular the invention concerns itself with recording of expenses and maintenance of expense records for purposes of income tax returns.

As is well known, contemporary income tax regulations require accurate records of business expenses to be kept in order for such expenses to be tax deductible, and it is therefore important for each individual, firm, corporation or other business entity to record expenses as they occur and to preserve the expense records along with pertinent receipts, so that the same may be properly taken into consideration in the preparation of a tax return at the end of the fiscal year. The preparation and maintenance of such records can easily become a formidable task, particularly for individual business men or firm employees who travel extensively during the course of a year, and it is, therefore, the principal object of this invention to provide an accounting system whereby the procedure of recording expenses and maintaining an accurate record thereof may be considerably simplified.

As such, the invention provides, as one of its important features, a set of booklets containing printed matter and blank spaces for recording of expenses, each booklet of the set being intended for one week of the year and having facilities for recordation of expenses on a day-by-day basis, with totals for the week. Each booklet also contains a pocket in which receipts may be kept to substantiate all or at least some of the expenses incurred. Such a pocket is provided with a flap or cover which constitutes a closure therefor, and another important feature of the invention resides in the utilization of the pocket closure flap or cover as means for retaining the booklet in a closed position when all the expenses have been recorded therein at the end of the week, so that if desired, the closed booklet may be sent through the mail, in the manner of an envelope, to the "home office" of the travelling executive or salesman, to be further dealt with as explained below.

Another important feature of the invention resides in the provision of annual summary sheets on which week-by-week expenses may be recorded, means being provided whereby the transfer of data from the individual weekly expense booklets to the annual summary sheets may be effected with considerable speed and accuracy.

A further important feature of the invention lies in the provision of an especially constructed folder in which the set of weekly expense booklets, both used and unused, may conveniently be kept, along with an annual summary sheet pertaining thereto, whereby the folder with its contents may constitute a complete, compact and readily available record of all expenses sustained during a business year.

Other advantages of the invention reside in its simple arrangement, in its convenient and accurate use, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a perspective view of one of the weekly expense booklets used in the invention, showing the same in an open position;

FIGURE 2 is a perspective view showing the booklet of FIGURE 1 in its closed position;

FIGURE 3 is a fragmentary group plan view showing the relationship of pages of the booklet to the annual summary sheet;

FIGURE 4 is a perspective view showing a modified embodiment of the weekly expense booklet in its open position;

FIGURE 5 is a perspective view showing the booklet of FIGURE 4 in its closed position;

FIGURE 6 is a perspective view, on a reduced scale, of the folder or container in which a set of booklets may be kept;

FIGURE 7 is a rear elevational view of the folder or container shown in FIGURE 6; and FIGURE 8 is a vertical, longitudinal sectional view of the folder with booklets therein indicated by dotted lines.

Referring now to the accompanying drawings in detail, more particularly to FIGURES 1 and 2 thereof, the general reference numeral 10 designates a booklet for recordation of tax deductible expenses, one such booklet being intended for recording of expenses on a day-by-day basis for each week of the fiscal year, so that a set of fifty-two or fifty-three identical booklets are provided in the accounting system of the invention for the entire year.

Each booklet 10 has integral front and rear covers 11, 12 and a set of intermediate leaves 13 stapled or otherwise bound therebetween, the covers preferably being made from stiffer paper stock than the intermediate leaves. The leaves 13 are folded along fold lines 14 where they are bound to the covers 11, 12, and the folded leaves provide individual pages which may be consecutively numbered, for example as indicated at 15 by the page numbers 2, 3, 4 and 5 in the upper portion of FIGURE 3 which shows the arrangement of the leaves. In this illustration the booklet pages are assumed to be opened to a flat lying position, so that the left-hand and right-hand pages are in a flat sheet form, regardless of the leaf arrangement which serves to make them so.

In any event, the pages of the booklet are provided with printed matter so that when the booklet is opened, for example as to reveal pages 2 and 3 as shown in the left-hand upper portion of FIGURE 3, rulings are provided for a series of vertical columns 16 juxtaposed to a column of weekdays 17. The vertical columns 16 are marked at the top thereof as A, B, C, D, et cetera, and in actual practice this marking is in the form of headings for various kinds of expenses sustained each day, such as for example, food, lodging, travel, postage, secretarial service, tips, stationery, et cetera, the totals of the respective columns 16 being entered in spaces along the lower edge portion of the pages, as indicated at 18.

Inasmuch as the variety of expense items under the different headings of the vertical columns 16 may well exceed the space available on two adjacent pages of the booklet, as for example, the pages 2 and 3 in the left-hand upper portion of FIGURE 3, such headings may be continued in columns on succeeding pages, for example, pages 4 and 5 in the right-hand upper portion of FIGURE 3, and on additional succeeding pages, if necessary. In any event, at the end of the vertical columns 16, spaces 19 are provided for totals of the expenses for each day of the week, as well as for the grand total expense of the week in the space 20, as will be clearly apparent. Thus, different kinds of expenses sustained each day may be entered under appropriate headings and totalled in the column 19 at the end of the day. This procedure may be repeated from day to day and at the end of the week the different expense columns 16 may be totalled in the spaces 18 and the grand total expense entered in the space 20. A suitable space 21 is provided on each or every other page of the booklet for the week number, that is, the number of the week in a year, and a suitable calendar (not shown) may be printed on one of the booklet pages, with weeks of the year appropriately numbered, so that the number of any particular week may be readily determined.

When the week's expenses have been recorded in the booklet 10, the column totals in the spaces 18 and 20 are copied onto an annual summary sheet 25 which also constitutes a component of the accounting system. A portion of this sheet is shown at the bottom of FIGURE 3, wherein it will be noted that the sheet is ruled to provide vertical columns 16' which correspond in width and number to the columns 16 in the booklet 10 and are correspondingly headed for various kinds of expenses. A column of week numbers 26 is juxtaposed to the columns 16' on one side, and on the other side is a column of spaces 20' for weekly totals. The columns 16 in the booklet 10 are bordered at the outside thereof by double lines or relatively heavy lines 27 (as distinguished from the relatively light, single lines between the columns themselves), and the summary sheet 25 is similarly provided with double or heavy lines 27', so that when it is desired to copy totals in the spaces 18, 20 of the booklet onto the summary sheet, the booklet is simply placed on top of the sheet so that the lines 27, 27' are in alignment and the lower edge of the booklet is immediately above the horizontal line of spaces on the summary sheet for the particular week number to which the total expenses are applicable. Since the totals in the booklet spaces 18, 20 are at the lower edge of the booklet, they may be quickly and easily copied onto the summary sheet without the necessity of referring to the column headings, either in the booklet or on the summary sheet. The manner in which the booklet is applied to the summary sheet is indicated by the dotted lines 28, while the arrows 29 indicate that booklets of progressively higher week numbers are applied progressively lower to the summary sheet. The sheet, of course, has spaces (not shown) at the bottom of the columns 16' and 20' for totals for the whole year, as will be understood.

Any receipts such as may be obtained to substantiate expenses may be stored in an envelope-like pocket 30 which is adhesively or otherwise suitably secured to the inner surface of the back cover 12 of the booklet 10, as illustrated in FIGURE 1. The pocket 30 has a closure flap 31 which may be folded over the mouth 32 of the pocket to prevent receipts from falling out while the booklet is either opened or closed. However, when all expenses have been recorded in the booklet at the end of the week, the flap 31 may be folded over the closed booklet so that it is superposed on the front cover 11 and secured thereto by adhesive 33 provided on the flap, whereby to retain the booklet in its closed position as illustrated in FIGURE 2. As such, the closed and sealed booklet may be sent through the mail to the "home office," or it may be placed in a storage container as hereinafter described.

FIGURES 4 and 5 illustrate a modified embodiment of the booklet which is designated by the numeral 10' and comprises front and rear covers 11', 12', respectively, with leaves 13 therebetween as in the booklet 10. However, in the booklet 10' the receipt pocket 35 is hingedly attached to the outer side edge of the cover 12' and has an inwardly opening mouth 36 which is automatically closed when the pocket 35 is folded inwardly against the inner surface of the cover 12'. If desired, the pocket 35 may be formed integrally with the covers 11', 12', and when the booklet is closed at the end of the week, the pocket 35 is folded over the closed booklet so that it is superposed on the front cover 11', as shown in FIGURE 5. The cover 11' is provided with a pair of oblique slits 37 in which corner portions of the pocket 35 may be inserted to hold the booklet closed, and additional fastening means are provided by forming the cover 11' with a U-shaped cut 38 defining a tab or tongue 39 which may be inserted in a slit 40 formed in the outer wall of the pocket 35, as will be readily apparent.

FIGURES 6, 7 and 8 illustrate an expansible folder or container 42 which may be used for storage of the entire set of booklets for the year, as well as the annual summary sheet when folded. The container 42 may be made from heavy paper stock or light cardboard so as to provide front and rear walls 43, 44, a bottom 45 and a top or cover 46, the front end portion 46' of which may be tucked inside the front of the container when the cover is closed, as shown in FIGURE 8.

The container also has a pair of side walls 47 and both these side walls and the bottom 45 are zig-zag folded as shown, so that the container may be expanded or contracted longitudinally, that is, from front to back, to vary the space between the walls 43, 44. A plurality of transverse partitions 48 may be provided between the side walls 47, and the entire set of booklets (10 or 10') may be stored in the compartments between these partitions. As the booklets are filled with data at the end of successive weeks, the filled in booklets may be placed at the back of the container and fresh booklets withdrawn from the front. It will be appreciated that the filled in booklets with receipts in the pockets thereof will be somewhat thicker than the unused booklets, and the expansion of the container as facilitated by the walls 45, 47 enables the container to accommodate all the booklets, even when they are all filled at the end of the year. An elastic band 49 is fastened to the back wall 44 by a single rivet, or the like 50, and extends perimetrically around the side walls 47 and front wall 43 so as to bias the container to its contracted position. When the container cover 46 is closed, the band 49 may be turned about the fastener 50 so that it extends over the closed cover, downwardly over the front wall 43 and under the bottom 45 as indicated by the dotted lines 49', thus retaining the cover in its closed position as well as biasing the container to its contracted form.

While in the foregoing there have been described and shown the preferred embodiments of the invention, various modifications may become apparent to those skilled in the art to which the invention relates. Accordingly, it is not desired to limit the invention to this disclosure and various modifications may be resorted to, falling within the spirit and scope of the invention as claimed.

What is claimed as new is:

1. In an accounting system, a booklet having front and back covers and a set of leaves bound therebetween, said leaves forming pages having printed matter and blank spaces for recording of expenses, each of said covers having an inner edge where said leaves are bound, an outer edge opposite from said inner edge, and a pair of side edges spaced apart by a longitudinal dimension of the cover, a pocket for expense substantiating receipts integrally hinged to the outer edge of the back cover and superposed on the front cover when the booklet is closed, said pocket having a pair of free side edges and a free outer edge and being open in the direction of the outer edge of said back cover, the pocket being constituted by inner and outer pocket forming walls secured together along the side and outer edges of the pocket, said side edges of the pocket being spaced apart by a longitudinal dimension of the pocket which is less than said longitudinal dimension of said covers and the side edges of the pocket being spaced longitudinally inwardly from the side edges of the covers so that side edge portions of the front cover project longitudinally outwardly beyond the side edges of the pocket when the pocket is superposed on the front cover in the closed position of the booklet, said front cover being provided with a pair of diagonal slits in corner portions of the front cover defined by its inner and side edges, a pair of corner portions of said pocket defined by its inner and side edges being removably inserted in said slits, and a tongue struck out from said front cover adjacent its inner edge and centrally between its side edges, said tongue overlying said pocket and the outer wall of the pocket being formed with a slit through which the tongue is removably inserted into the pocket, said corner portions of the pocket inserted in said pair of slits and said tongue inserted in the pocket slit coacting to releasably retain said pocket in its superposed position on the front cover when the booklet is closed.

2. The accounting system as defined in claim 1 wherein said blank spaces on said pages of said booklet are arranged in vertical columns divided by vertical lines extending to the bottom side edge of each page, said printed matter on each page being provided at the head of said vertical columns and totals of recorded expenses being entered at the lower ends of the columns adjacent said bottom side edge of each page, together with a summary sheet having blank spaces arranged in vertical columns divided by vertical lines corresponding to those on the pages of said booklet, said booklet in an open position being superposed on said summary sheet with the vertical lines of the summary sheet aligned with those on the booklet pages, whereby totals of expenses recorded in the booklet page columns may be visually coordinated and readily copied onto the respective columns of the summary sheet.

References Cited by the Examiner

UNITED STATES PATENTS

| | | | |
|---|---|---|---|
| 685,151 | 10/01 | Landing | 282—8 |
| 831,023 | 9/06 | Brown | 282—3 |
| 1,343,879 | 6/20 | Jongepier | 283—63 |
| 1,698,841 | 1/29 | Doughty | 129—15 |
| 1,912,710 | 6/33 | Kennedy | 281—31 |
| 2,519,405 | 8/50 | Schwinger | 229—72 |

FOREIGN PATENTS

| | | |
|---|---|---|
| 80,188 | 2/20 | Austria. |
| 332,119 | 7/30 | Great Britain. |
| 842,578 | 7/60 | Great Britain. |

JEROME SCHNALL, *Primary Examiner.*

LAWRENCE CHARLES, *Examiner.*